Sept. 30, 1952     E. GYGAX     2,612,081
MACHINE TOOL

Filed Aug. 17, 1945     5 Sheets—Sheet 1

INVENTOR:
ERNEST GYGAX,
ATTORNEYS.

Sept. 30, 1952        E. GYGAX        2,612,081
MACHINE TOOL Filed Aug. 17, 1945        5 Sheets-Sheet 2

INVENTOR:
ERNEST GYGAX,
ATTORNEYS.

Sept. 30, 1952  E. GYGAX  2,612,081
MACHINE TOOL

Filed Aug. 17, 1945  5 Sheets—Sheet 3

INVENTOR:
ERNEST GYGAX,
BY Kingsland, Rogers Ezell

ATTORNEYS.

Sept. 30, 1952  E. GYGAX  2,612,081
MACHINE TOOL

Filed Aug. 17, 1945  5 Sheets-Sheet 4

INVENTOR:
ERNEST GYGAX,
By Kirkland, Rogers & Ezell
ATTORNEYS.

Sept. 30, 1952  E. GYGAX  2,612,081
MACHINE TOOL
Filed Aug. 17, 1945  5 Sheets-Sheet 5

INVENTOR:
ERNEST GYGAX,
By Kingsland, Rogers & Ezell
ATTORNEYS.

Patented Sept. 30, 1952

2,612,081

UNITED STATES PATENT OFFICE 2,612,081

MACHINE TOOL

Ernest Gygax, St. Louis, Mo., assignor to Gemco Shaper Company, a corporation of Missouri Application August 17, 1945, Serial No. 611,113

22 Claims. (Cl. 90—48)

This invention relates to machine tools, and more particularly to improved means for electrically controlling the feed mechanism of such tools as require the work feed mechanism to be operated intermittently.

An object of the invention is to provide in machine tools of the class mentioned, improved electrically controlled mechanism, whereby the work table of the machine may be operated to selected extents of movement, and at predetermined rate of feed.

Another object is to interlock the control mechanism to prevent interference with the selected operation, thereby avoiding interference with the normal operation of the parts during the selected movement of the work feed.

Another object of the invention is to provide for power actuation of the work table for setting it in selected positions either horizontally or vertically, as well as in other straight line positions.

Another object, as a special application of the invention, is to control the operation of a shaper, having a reciprocating ram, whereby the feeding operation occurs during the return stroke of the ram.

The invention generally comprises a work feed mechanism including a work supporting table mounted for horizontal, and vertical movement; actuating mechanism to effect the movement of said table selectively; interlocking controls for the movements of the work table to prevent interference with a selected movement once it is initiated; and means for selectively predetermining the timing and extent of movement selected.

Additional advantages of the invention will be apparent from the following detailed description taken in connection with the accompanying drawings, in which.

In the embodiment of the invention selected for illustrations, the structure is shown as embodied in and associated with a metal shaper, although it will be understood that it has other application.

Machine elements of work support and operating mechanism therefor

Figure 5:
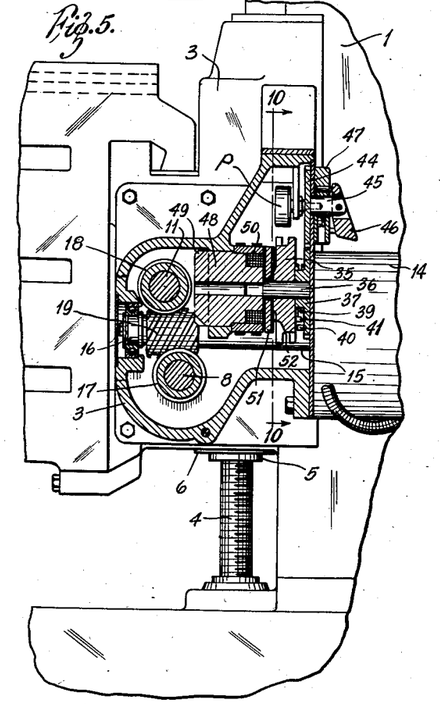
Fig. 5 is a vertical sectional view on the line 5—5 of Fig. 4, showing other elements and features controlling vertical and horizontal movements of the work supporting table.
Figure 6:
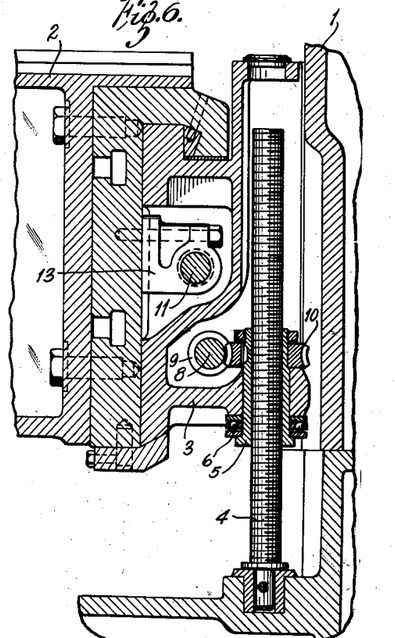
Fig. 6 is an enlarged vertical sectional view on the line 6—6 at the middle of Fig. 1.

The shaper tool, as illustrated, includes a base or frame 1, frequently referred to as the column, and a work-supporting table 2 mounted for vertical and horizontal movements. The table 2 is mounted on a frame 3, conventionally called the cross rail, along which it has horizontal movement in both directions. The frame 3 is supported on the front of the main frame 1 of the machine. The frame 3 may be raised and lowered in a vertical plane. The frame 3 engages the front end of the shaper frame 1 and is guided and held from displacement during its vertical movements thereby. A screw threaded shaft 4 is supported in the shaper frame 1 (Figs. 5 and 6). This shaft extends vertically and is non-rotative in respect of the frame. An internally threaded rotary sleeve 5 has threaded engagement with the shaft 4, the sleeve 5 being mounted in and supported vertically in the frame 3 by an anti-friction bearing 6. As illustrated, the sleeve 5 is rotative about the shaft 4 which is held stationary, whereby rotation of the sleeve causes the sleeve 5 to move vertically in respect to the shaft 5 in both directions. Since the sleeve 5 is connected with the frame 3, the frame 3 will be raised and lowered in response to the rotation of the sleeve 5.

The operating mechanism for moving the work-supporting table 2 for positioning the work for selected machine operations, includes a rotary horizontal shaft 8 supported in the vertically moving frame 3. A worm 9 on the shaft 8 meshes with a worm gear 10 attached to the sleeve 5 (Fig. 6) whereby, when the shaft 8 is rotated, the gear 10 and the sleeve 5 will also be rotated to raise and lower the frame 3 and the table 2.

Figure 4:
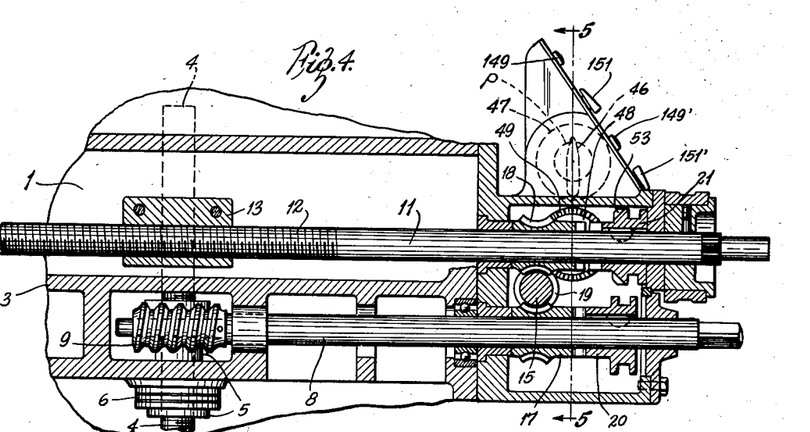
Fig. 4 is a vertical sectional view on the line 4—4 of Fig. 3, illustrating the gearing for effecting vertical and horizontal movements of the work supporting table.

The frame 3 also supports a rotary horizontal shaft 11 spaced from and above the shaft 8. One end of the shaft 11 is screw threaded at 12, and is screwed through a threaded hole in a bracket 13 which is rigidly attached to and supported by the table 2 (Fig. 4). Thus, rotation of the shaft 11 will impart horizontal movements to the table 2, while rotation of the shaft 8 will impart vertical movements to said table.

In the embodiment illustrated, an electric motor 14 (Fig. 5), attached to and supported by the frame 3, constitutes the power means for rotating the shaft 8, whereby the table 2 is moved vertically in either direction and also to rotate the shaft 11 for moving the table 2 in its horizontal paths of movement.

The motor is of the reversible type and may be controlled to rotate a motor shaft 15 either clockwise or counterclockwise, as predetermined by the operator. Provision is, therefore, made for driving the shafts 8 and 11 selectively in either direction, whereby selected horizontal and vertical movements of the work-supporting table in either direction may be effected. The motor shaft 15 extends forwardly and is supported at its extremity in an anti-friction bearing 16 mounted in and supported by the frame 3 (Fig. 5).

It will be understood that, when the motor 14 is energized, the motor shaft 15 is constantly rotated in the selected and predetermined direction of the rotation, and, to effect selected drive of the shafts 8 and 11, it is operatively connected therewith by gear connections which include a worm gear 17 rotatably mounted on the shaft 8 and a similar gear 18 rotatably mounted on the shaft 11. The motor shaft carries a worm gear 19, which gear is positioned intermediate the gears 17 and 18 and in constant mesh therewith.

Selective mechanism for rotating either the shaft 8 (Figs. 4, 7) or the shaft 11 is provided.

Figure 7:
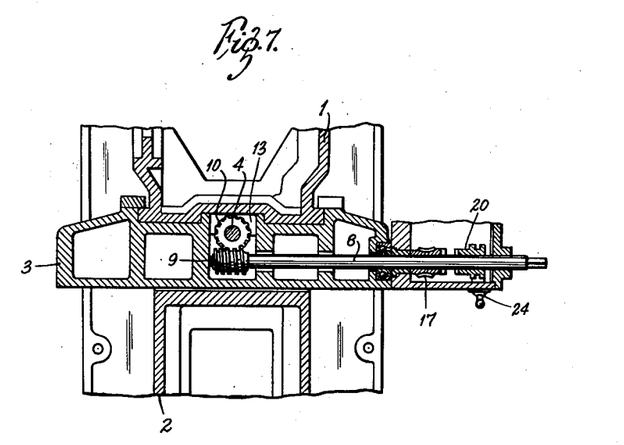
Fig. 7 is an enlarged horizontal sectional view on the line 7—7 at the lower middle of Fig. 1.

A clutch member 20 is carried on the shaft 8 and has horizontal sliding movement in respect thereto, whereby it may be moved into and out of clutching engagement with the worm gear 17. With the clutch member 20 in clutching engagement with the worm gear 17, the shaft 8 will be thereby rotated in a direction of rotation predetermined by the selected direction of rotation of the motor shaft 15. Since the worm gear 9 is in mesh with the gear 10 on the sleeve 5, upon rotation of the shaft 8 the sleeve 5 will be rotated, and rotation of said sleeve about and relative to the shaft 4 causes vertical movement of the frame 3 in the predetermined direction, thereby optionally raising or lowering the frame 3 and the work-supporting table 2.

A second clutch member 21 is carried on the shaft 11, and has horizontal sliding movement in respect thereto, whereby said clutch member may be moved into and out of clutching engagement with the worm 18. The shaft 11 thus may be rotated in either direction when the clutch member 21 is in clutching engagement with the worm gear 18 and the frame 3, and the table 2 supported thereby may be moved horizontally in either direction along the frame 3.

Figure 8:
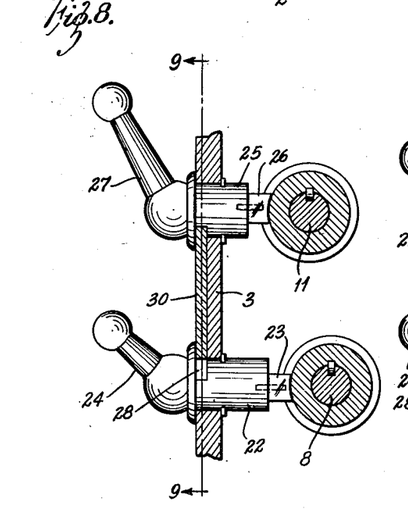
Fig. 8 is an enlarged vertical sectional view on the line 8—8 of Fig. 1.
Figure 9:
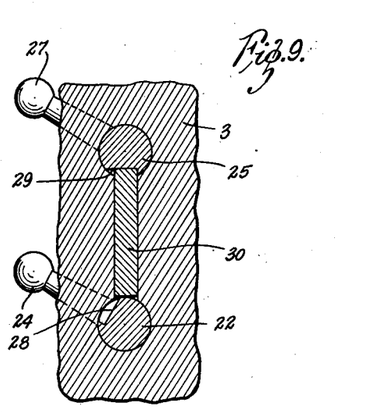
Fig. 9 is a vertical sectional view on the line 9—9 of Fig. 8.

The clutch member 20 may be shifted by the rocking shifter member 22 (Figs. 8, 9), having eccentric engagement 23 therewith. A hand lever 24 is attached to said shifter element 22 for rocking the same, whereby the clutch member 20 is shifted into and out of clutching engagement with the worm 17.

Similarly, the clutch member 21 may be actuated into and out of clutching engagement by a rocking shifter member 25, which has an eccentric connection 26 with said clutch member 21. A hand lever 27 is connected with the rocking shifter element 25 whereby it is operated to position the clutch member.

The hand levers 24 and 27 and the rocking shifting members 22 and 25 are mounted in and supported by the frame 3 adjacent to the clutch devices in a position convenient to the operator so that the movement of the work-supporting table 2 may be readily controlled.

In order to prevent simultaneous engagement of the clutch members 20 and 21 with the worm gears 17 and 18, respectively, and to thereby prevent initiating movement of the table 2 in one direction when movement in the other direction has begun, an interlocking device is provided. The illustrated structure for attaining this result includes complementary cams 28 and 29 formed in the cylindrical walls of the rocking shifter elements 22 and 25. A sliding plate 30, that constitutes a detent or lock, is mounted between the the members 22 and 25 and is slidable vertically in a groove formed in the frame 3 between the said shifter elements.

As will be observed from the embodiment (Fig. 9), as a result of the complementary formation of the cams 28 and 29, the rocking shifter elements are interlocked in such a manner that, when either is moved to shift the respective clutch member 20 or 21 to clutching engagement, the other is locked against movement. However, both of the shifter elements 22 and 25 may be operated to shift and hold the respective clutch members 20 and 21 out of clutching engagement at the same time. Effective provision is, therefore, made to prevent the table 2 from being moved both vertically and horizontally at the same time, because, when one clutch member is being moved into engagement, the operation of the other clutch member to clutching engagement is prevented by this interlocked relationship of the shifter elements.

*Machine elements of reciprocating tool carrier and operating mechanism therefor*

In the type of shaper tool illustrated, a reciprocating ram 7 is mounted in the head of the machine and is operatively associated with a drive mechanism therefor, whereby the ram is reciprocated horizontally above the plane of the table 2. This ram is equipped at its forward end with a tool support in which selected tools, required for shaping the work pieces supported by the table 2, are mounted. The mechanism for reciprocating the ram may be such as that disclosed in the Patent No. 2,295,130, issued September 8, 1942, to John H. Schreiber et al.

The mechanism for reciprocating the ram or tool carrier 7 is not per se a part of the present invention, but, inasmuch as the controls of the work table are coordinated with the standard movement of the reciprocating tool carrier, a brief description of the operation of that member will clarify an understanding of the relationship of the movements.

The ram or reciprocating tool carrier 1 is mechanically operated and completes a reciprocating cycle, which includes the forward or working stroke, and the return or idle stroke within a predetermined time interval. The mechanical means for reciprocating the ram is powered or actuated usually by an electrical motor, the energization of which is controlled by standard line and local switch devices.

The power shaft to the motor is mechanically connnected to the ram so that the length of the working stroke may be determined. The time interval of the complete reciprocating cycle of the ram is so adjusted that the working stroke of the ram is at a less rate of speed than the return stroke. Thus, the operation of the ram can be adjusted for various machining operations.

*Electrical operating control system*

In order to insure the accuracy of the operation of the tool, a complete electrical control system is provided, which includes the following primary controls.

The straight line intermittent horizontal feed movement of the work table, after the angle movement has been predetermined by the selective mechanical devices heretofore described, is positively controlled in such a manner that the table may only be moved during selected intervals in the return or idle stroke of the reciprocating tool carrier.

A control determining the extent of straight line horizontal movement, as well as the rate of movement of said table, is provided in order to adapt the table movement to different machining operations. That is to say, the rate of movement of the table is coordinated with the extent of movement, whereby the speed of movement of the table is increased where the particular machining operation requires a greater distance of movement, and the speed is reduced where the distance of movement in the particular machining operation is less.

Additional controls are provided for setting up the work including provision for rapid power movement of the work table in different angle and straight line adjustments.

In addition to the primary controls, certain line and local controls for the electrical system may be provided to insure convenience and safety of operation.

One of the primary purposes of the present invention is to control the horizontal feeding movement of the work table so that the movement thereof may be coordinated with the movement of the ram, and to limit the positioning movement of the work table both horizontally and vertically during the interval of the return or idle stroke of the ram to insure that the work piece will be rigidly set when the tool is moved in a horizontal plane therewith to perform the cutting stroke in the operation of the tool.

Figure 2:
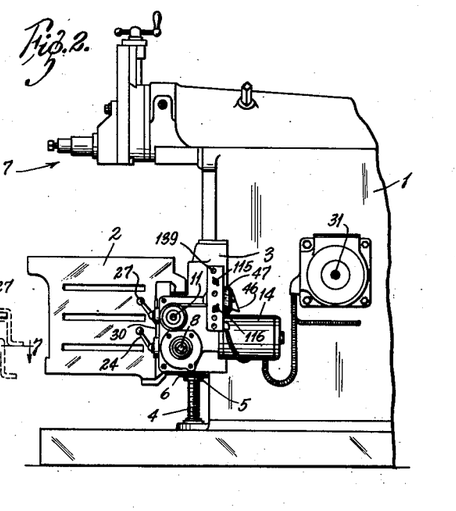
Fig. 2 is a side elevation of the front portion of the machine and the work supporting table, with which the present invention is cooperatively associated.

The control for this purpose includes a shaft 31 (Figs. 2, 3) which is geared to the source of power for operating the ram 1 in such a manner that said shaft makes one complete rotation during one complete reciprocation of the ram. A cam disc is carried by and rotates with the shaft 31. This cam disc has a low segmental face 32 and a high segmental face 33. The length of the arc of the low face 32 is substantially greater than the length of the high face 33. Since the overall movement of the mechanism operated by the motor 14, the power source for the work table, is under the control of this cam, and, since as above stated, the time interval of movement of the ram during its working stroke is longer than the time interval during the return stroke, the shorter high face 33 of the cam, which controls the energization of the motor 14, necessarily has a lesser interval in the rotation of the cam, than the period in which the motor 14 is de-energized during the period of travel of the low face 32 of the cam.

The cam 32—33 is in operative relationship with a switch 34 which is in the main power circuit to the motor 14, which switch 34 is open during the period of travel of the low face 32 of the cam, and is closed when the high face 33 of said cam contacts with the operating contact member of said switch. The switch 34, therefore, is in effect a sequence switch openig and closing the electrical circuit for operation of the motor 14 in response to the rotation of the cam limiting the energization of the motor 14 to the period of time that the high face 33 of the cam is in operative contact with the switch 34. Any movement of the work table is, therefore, limited to that period of operation during the return or idle stroke of the ram.

In a metal shaper tool the normal movement of the work table is intermittent and in a horizontal path, it being understood that the straight line movement is in both directions. This movement of the work table is controlled in extent to adapt it to different machining operations, and the rate of movement is controlled dependent upon the extent.

Figure 1:
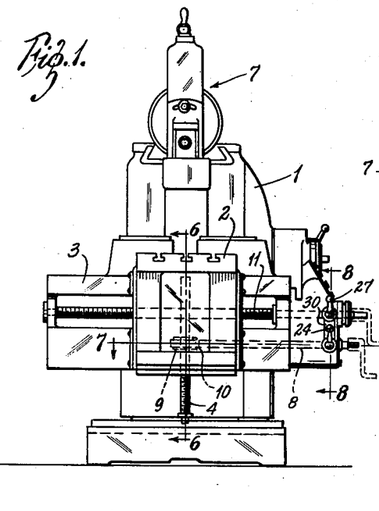
Fig. 1 is a front elevation of a shaper including a reciprocating ram or tool carrier, and a vertically and horizontally movable work supporting table, and equipped with electrical controls for positioning and feeding operations.

The extent of movement of the work table is controlled by a pair of complementary cam operated feed switches, one of which is operative when the shaft of the motor 14 is operated clockwise, and the other when operated counterclockwise, whereby the work table is moved either to the right or left (Fig. 1).

This control includes a switch actuating cam element 35 mounted on a stud shaft 36 (Figs. 5, 10–12). The cam element 35 is operatively connected with a pinion 37 mounted for rocking movement on the shaft 36, and the cam element and the pinion 37 are connected by a coil spring 39 mounted on the hub of the pinion 37 and having one end engaged with the pin 40 attached to said pinion, and the other end engaged with the pin 41 attached to the cam element 35. The spring 39 constitutes a resilient connection between the pinion 37 and the cam element 35, whereby, when the pinion 37 is rocked, it will tend to rotate the cam element 35. The said spring also serves to return the parts to initial setting when the magnetic clutch, later to be described, is deenergized.

Figure 10:
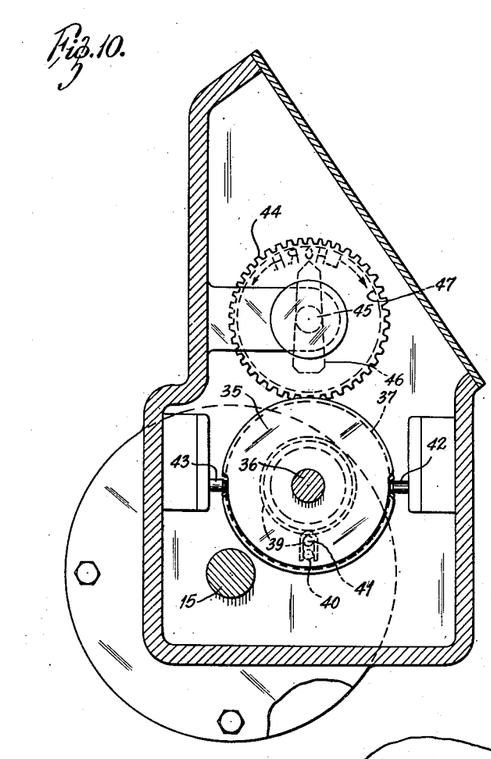
Fig. 10 is a vertical section on the line 10—10 of Fig. 5.
Figure 11:
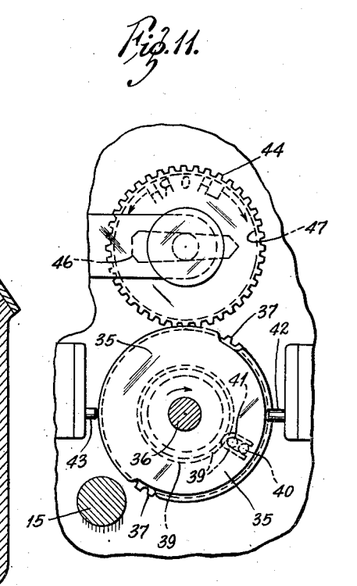
Fig. 11 is a fragmentary view similar to Fig. 10, showing the settable device in a position in which the cam, that operates the intermittent work table feed switch, is adjusted for a predetermined feeding operation.
Figure 12:
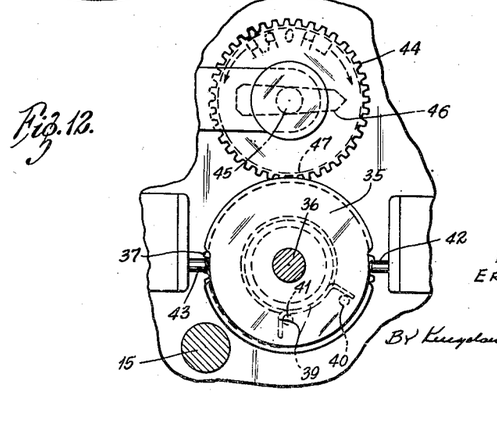
Fig. 12 is a view similar to Fig. 11 illustrating the cam actuated switch, in a position at the end of the feed operation.

The cam element 35 includes complementary arranged cam faces, one of which is aligned in operative association with a switch member 42 in the circuit to the motor 14, when said circuit is energized to rotate the motor shaft in one direction, and the other cam face is operatively associated and aligned with a switch member 43, which controls the circuit to the motor 14 when the motor thereof is electrically energized to rotate the shaft thereof in the other direction. The high and low surface of the cam faces are arranged on the circumference of the cam member 35 in such relative segments as that in the initial setting, both switches 42 and 43 are open (Fig. 10). Said cam member 35 is rotated, either clockwise or counterclockwise dependent upon the predetermined rotation of the power shaft of the motor 14. The length of the feed of the work table 2 is dependent upon the interval that the switch 42 or 43 is closed, and this interval, in turn, is related to the movement of the work table 2. In Fig. 11, the cam is illustrated as adjusted to close the switch 43, leaving a segment of the high face in a position to contact the switch, and maintain it closed during a partial rotation of the cam member 35.

Unless the cam element 35 is restrained by a magnetic clutch, later to be described, it is free to rotate on the shaft 36 which condition obtains while the switch 34 is open. This permits an initial setting of the cam, thereby controlling the extent of feed of the work table.

The device for setting the cam member 35 for the predetermined movement of the work table includes a pinion 44 that meshes with the pinion 37. The pinion 44 is carried by a spindle 45 supported for rocking movement in the frame 3 of the machine above and adjacent to the motor 14. A finger piece or handle 46 is attached to the outer end of the spindle 45, which handle by coordination with a dial 47 (Fig. 3) indicates the proper setting, and provides manual means for the preliminary adjustment of the work support feed.

The operation that responds to the manual setting of the handle 46 is the length of the intermittent feed of the work table in a horizontal path, and also the rate of feed, because the extent and direction that the spindle 36 is rocked, in addition to setting the cam member 35, also coordinately sets a potentiometer P in the circuit of the motor 14, thereby controlling the speed of the motor to synchronize the speed of movement of the table with the extent of movement of the work support. It will be understood that the speed of movement is increased as the distance of movement is increased and reduced as the extent of feed is reduced.

The effect of the operation of the switches 42 and 43 is that, by manually setting the device just described, the cam member 35 is brought to an initial adjustment when one or the other of the switches 42 and 43 is closed by contacting the respective high face of the cam at a predetermined point thereon, so that the respective switch will remain closed, until the cam has traveled a sufficient distance for the switch element to ride off of the high face and onto the low segmental face, opening the switch.

Fig. 11 illustrates the manual settable device adjusted to set the cam member 35 so that the high face of the left hand segment of the cam member 35 closes the switch 43 and the cam is required to travel an arcuate distance before the switch is opened by the contact member thereof riding off of the high face to the low segment of the cam.

Assuming that the switch 34 (Fig. 3) has been closed, which is the adjustment of that switch that obtains upon the return stroke of the ram 7, as has already been explained, the circuit to the motor 14 will be closed, and will remain closed so long as either of the respective switches 42 and 43 contact a high face of the cam element 35 and, therefore, the motor 14 will be energized, and will rotate in a direction predetermined by the control device for that purpose.

The device that coordinates the movement of the cam member 35 with the movement of the work table, comprises a magnetic clutch (Figs. 4, 5) that serves to couple the cam member 35 with the member 48 which, in turn, as will be explained, is geared to the shaft 11, which operates the cross or horizontal feed of the work table.

The member 48 has geared teeth 49 at one end, and a magnetic coil 50 set in the opposite end thereof.

The member 48 is fixed on the stud shaft 36 so that, when the cam member 35 is in clutching engagement therewith, the two members will rotate together and to the extent of rotation imparted to the member 48. The magnetic coil 50 is energized during the period that the switch 34 is closed and, when energized, the coil 50 draws an armature, in the form of a metallic disc 51, into clutching engagement with the end face of the member 48, whereby said disc will be rotated with said member 48 until the switch 34 is again opened. It will be understood that the disc 51 is slidable on the shaft 36 and is connected with the hub of the cam member 35 by a resilient disc 52, so that it may move on said shaft into contact with the magnetic coil when that coil is energized, and will be moved out of contact therewith when the coil is deenergized.

Since the switches 42 and 43 are in the circuit to the motor 14, the motor will stop immediately upon the opening of the respective switch 42 or 43, stopping the movement of the table and thereby, obviously, any further movement of the cam 35. The cam 35, however, remains coupled to the member 48 until the coil 50 is deenergized.

After the initial setting of the cam, as illustrated in Fig. 11, the further rotation of the cam by the feeding movement of the table to which the member 48 is geared is relative to the pinion 37, that is to say, the pinion remains stationary while the cam continues its rotation. Therefore, this movement by means of the spring connection between the member 35 and the pinion 37 tensions the spring 39 sufficiently so that, when the magnetic clutch is released, the cam 35 will be returned to its initial setting (Fig. 11).

The means for rotating the clutch member 48 in coordination with the cross or horizontal feed of the work table comprises a gear 53 (Fig. 4) on the hub of the clutch member 21. When the clutch member is shifted to couple the shaft 11 with the shaft 19, the gear 53 is moved into meshing engagement with the gear 48 on the member 49, so that the extent of rotation of the member 48 will respond to the extent of rotation of the shaft 11, and thereby to the extent of movement of the work table, through the mechanism heretofore described.

In other words, a given number of rotations of the shaft 11 is translated by the gearing described into a predetermined arcuate or angular movement of the cam member 35 so that, when the shaft 11 has made a given number of rotations resulting in a given length of feed of the work table 2, the arcuate high cam faces controlling the respective switch 42 or 43 will have completed its travel, and the switch controlling the circuit to the motor opens, thereby metering the feed movement of the work table.

Figure 13:
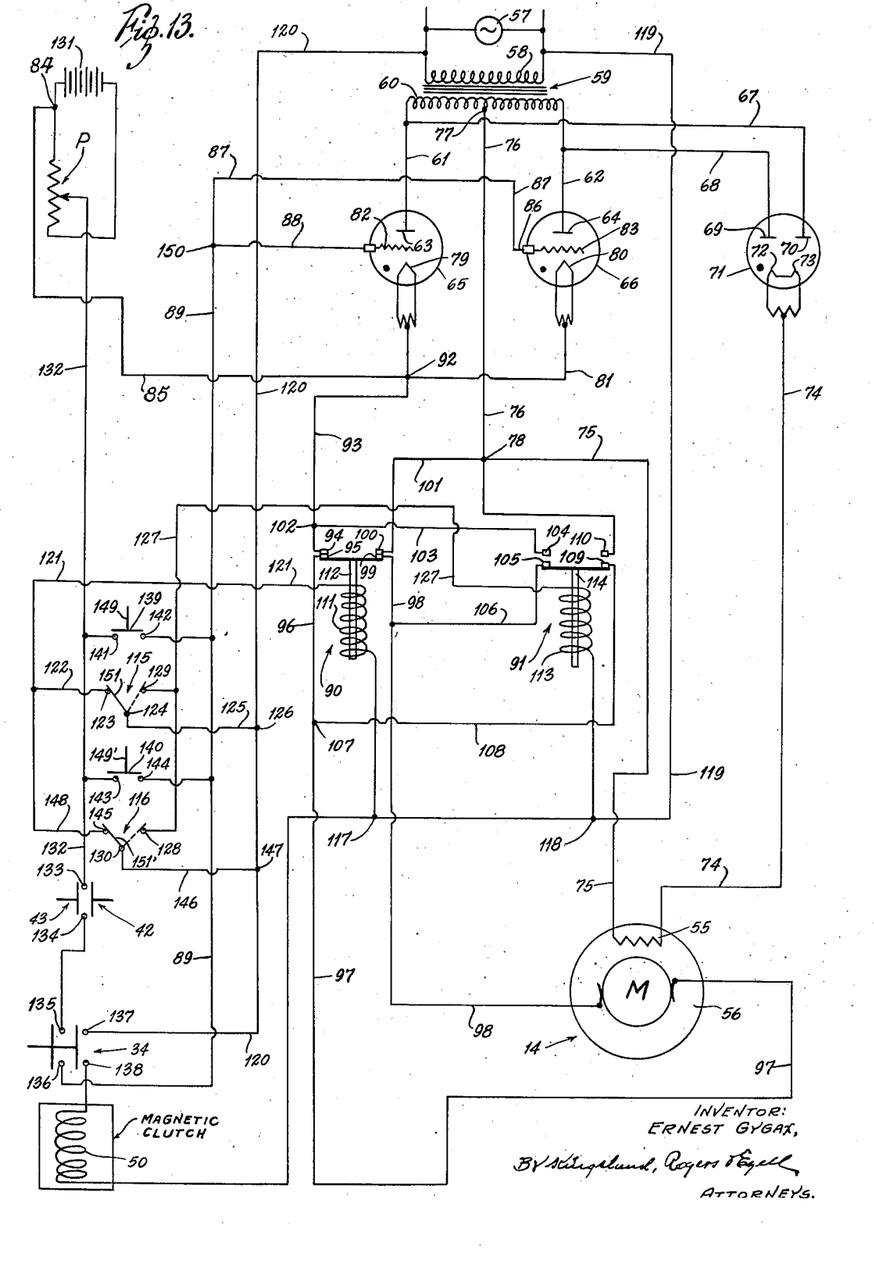
Fig. 13 is a wiring diagram of the electrically controlled circuit.

By reference to the diagram illustrated in Fig. 13, the coordinated controls will be more clearly understood.

The control circuit illustrated in this diagram is employed to control the operation of the direct current, variable speed, reversible motor 14, and thereby the direction and timing of the work table cross feed, and also the positioning movement of the work table, as has been explained.

The field winding 55 of the motor 14 is continuously energized while the rotor winding 56 is intermittently energized with varying current to operate the motor at variable speeds.

The control circuit may be thought of as comprising two branches, one of which supplies current to the field winding 55 and the other of which supplies current to the rotor winding 56. The control circuit is supplied energy from a suitable A. C. source 57 which is connected across a primary winding 58 of a transformer 59 serving both branches of the control circuit. A secondary winding 60 of the transformer 59 is center tapped to provide an electrical axis for the full wave rectifiers which supply current to both the field and the rotor windings of the motor 14. The end terminals of the secondary winding 60 are connected to the conductors 61 and 62, which are, in turn, connected to the plate electrodes 63 and 64 of the electronic discharge devices 65 and 66, respectively. The conductors 61 and 62 are tapped by a pair of lines 67 and 68, respectively, which feed the plates 69 and 70 of an electronic discharge device 71. This discharge device, in the illustrated embodiment, takes the form of a double-diode and acts as a full wave rectifier to supply current to the field winding 55 of the motor 14. The cathodes 72 and 73 of device 71 are connected to a common lead 74 which feeds the field winding 55, the latter element being connected through a line 75 to a lead 76 connecting a center tap 77 of the secondary winding 60 at a point 78. This latter connection completes the circuit, forming the branch provided to supply current to the field winding 55.

In like manner, current is supplied to the rotor winding 56 of the motor 14 by means of a full wave rectifier comprising in part the electronic discharge devices 65 and 66. The latter elements in the illustrated embodiment take the form of gas filled triodes which have their respective cathode electrodes 79 and 80 tied together by means of a common lead 81 which in turn is connected to the potentiometer P at point 84 by the conductor 85. Each of the grids 82 and 83 is supplied a control voltage through the lines 86, 87 and 88 as fed by a line 89 connected thereto at 150.

The full wave rectifier which feeds the rotor winding of the motor 14 performs an additional function of a switching circuit and a variable current supply circuit. When the tubes 65 and 66 are rendered conducting by the control voltage impressed on the grids 82 and 83, the rectifier is operative to pass current to the motor 14 and cause its operation. Conversely, when the tubes are nonconducting, the motor is stopped. Further, the amount of current passed by the devices 65 and 66 is dependent upon the potential of the control voltage supplied to these elements. This expedient provides a means for not only controlling the start-stop operation of the motor, but also its speed.

In addition to the control of the motor just described, provision is also made for reversing the direction of rotation of the motor. This operation is effected by the solenoid operated switches 90 and 91. In order to energize the rotor winding of the motor to operate in one direction, a circuit may be traced from the point 92 through the line 93, the closed contacts 94 and 95 of the switch 90, a line 96, a line 97, through the rotor winding 56, a line 98, the contacts 99 and 100 of the switch 90, a line 101 to the point 78 on the center terminal 76.

A similar circuit for energizing the rotor winding to rotate the motor in an opposite direction may be traced from a point 102, through a line 103, the contacts 104 and 105 of the switch 91 (when closed), a line 106 through the rotor winding 56, the line 97, the line 96 back to a point 107 thereon, thence through a line 108, contacts 109 and 110 of the switch 91 (when closed), back to the point 78 on the center tapped terminal 76.

The switches 90 and 91 are solenoid operated and, with the connections shown, the switch 90 is illustrated as being closed and the switch 91 is opened. For the operation of the switch 90, a solenoid having a winding 111 and an armature 112 is provided. Similarly, for the switch 91, a winding 113 and an armature 114 are likewise provided.

Energization of the windings of the solenoid switches 90 and 91 is controlled by the manually operable reversing switches 115 and 116, both of which are similarly connected to provide double controls for the reversing operation. The windings 111 and 113 are connected at the points 117 and 118 to a conductor 119 supplying current direct from the source 57. The opposite ends of each of the windings are connected to another source conductor 120 through the aforementioned switches 115 and 116.

The respective circuits for each of the windings are traceable as follows: For the switch 90, from the point 117 through the winding 111, a conductor 121, a line 122, the closed contacts 123 and 124 of the switch 115, line 125, through to the conductor 120 at a connection 126; or from the conductor 121, through the closed contacts 145 and 130 of the switch 116 and a line 146 through to the conductor 120 at a connection 147. For the switch 91, the circuit is traceable from a point 118, through the winding 113, a line 127, to either the open contact 128 of the switch 116 or the open contact 129 of the switch 115. With the switches 115 and 116 positioned to form the circuits just described, the winding 111 is energized, the winding 113 is deenergized, the switch 90 is closed, and the switch 137 is open to cause the rotation of the motor 14 in one direction.

When the switches 115 and 116 are closed to their second position, that is, when the contact 124 of the switch 115 is closed to its contact 129 and the contact 139 of the switch 116 is closed to its contact 128, then the circuits are traceable as follows: For the switch 90, from the point 117 through the winding 111, the lines 121 and 122 to the now open contact 123 of the switch 115; or to the lines 121 and 148, to the now open contact 145 of the switch 116. And for the switch 91, from the point 118, through the winding 113, the line 127, the contacts 129 and 124 of the switch 115, the line 125, to the contact point 126; or from the line 127, through the contacts 128 and 130 of the switch 116, a line 146, to a contact point 147 on the conductor 120. Thus, the coil 113 is energized, switch 91 is closed, the coil 111 is deenergized, and the switch 90 is opened to reverse the direction of rotation of the motor 14.

For controlling the operation of the full wave rectifier, supplying current to the rotor winding of the motor, a control voltage circuit is provided which, as illustrated, comprises a direct current source 131, the potentiometer P, a line 132, either of the switches 42 or 43 and the switch 34, and the line 89. The contacts 133 and 134 of the switch 42 or 43 and the contacts 135 and 136 of the switch 34 are operable to open or close the control voltage circuit in a manner which will be described in connection with the circuit's operation.

Through the contacts 137 and 138 of the switch 34, winding 50 of the electro-magnetic clutch is energized with alternating current directly from the source 57 through the conductors 119 and 129.

Further, the control voltage circuit is provided with a pair of manually operated shunting switches 139 and 140. Each of these switches is closeable to its respective contacts 141, 142, 143 and 144 to shunt the control voltage around the switches 42, 43 and 34. These switches are manually operable to position the table as moved by the motor 14 to any desired position, for the setting up of the work table as hereinbefore described.

In operation, and during the return stroke of the ram 7, the switch 34 is closed to its contacts 135 and 136, and to its contacts 137 and 138 by the mechanism heretofore described. The closing of the latter contacts energizes the winding 50 of the magnetic clutch (Fig. 5). This, in turn, connects the feed metering gear, and the feed switch cams to operate as a unit in the manner already fully explained. Thereafter, either the feed switch 42 or 43 is closed to the common contacts 133 and 134, which, through the switch 34, passes current from the control voltage source 131 to the grid electrodes 82 and 83, respectively, of the full wave rectifier supplying current to the rotor winding of the motor 14. The voltage thus impressed upon the control grids of these devices renders them conducting, and the rotor of the motor is energized to start the motor since the field winding 55 thereof is receiving continuously rectified current through the full wave rectifier 71. The motor is thus operated until the control voltage circuit is opened at either the switch 42, 43 or 34.

The amount of potential of the control voltage which is fed to the control grids 82 and 83 is determined by the setting of the potentiometer P by adjustment manually of the handle 46 of the settable device above described. This device is positioned to increase the speed of the motor 14 for long feeds and to decrease the same for short feeds to lengthen the feed cycle over as long a time as possible on the ram's return stroke, as has been explained.

When the operator desires to control the movement of the table manually, the automatic control switches 42, 43 and 34 are shunted from the circuit by means of the shunt switches 139 and 140.

When it is desired to reverse the direction of the rotation of the motor 14, the switches 115 and 116, which are interconnected, are operated as previously described.

Figure 3:
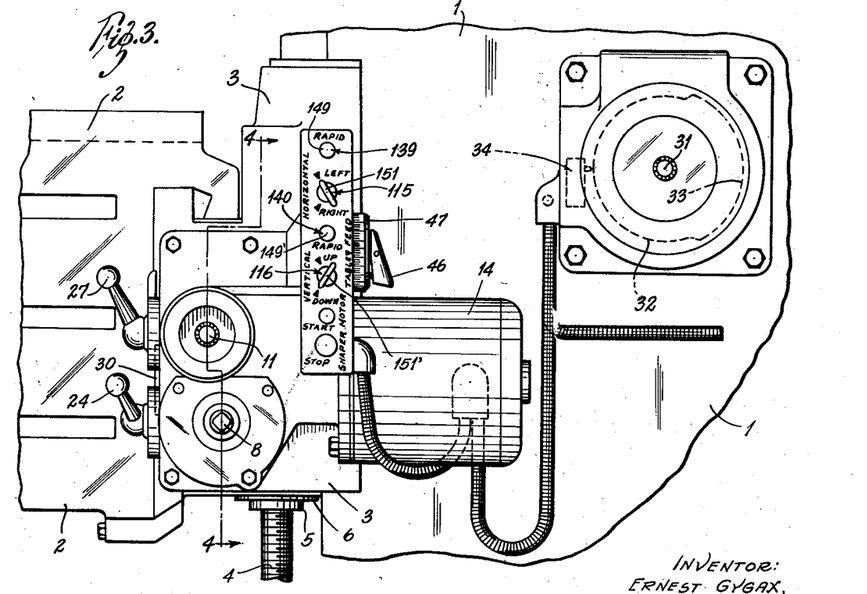
Fig. 3 is an enlarged side elevation of a portion of the shaper and the work supporting table.

It should be pointed out here that the manually operable reversing switches 115 and 116 and the manually operable shunting switches 139 and 140 are conveniently located on a control panel, as illustrated in Fig. 3. Control of the potentiometer P, which determines the speed of operation of the motor 14, is also effected from this panel by means of the operating handle 46. As will be noted from the circuit diagram, the switches 115 and 116 are similarly connected to provide double control for the reversing switches 90 and 91. Likewise, the shunting switches 139 and 140 are similarly connected to provide double switching means for shunting out the automatic controls of the circuit. This arrangement of these switches is provided for the convenience of the tool operator. Although, the switches 115 and 116 perform identical functions and the switches 139 and 140 perform identical functions, their respective operating mechanisms are given different legends on the control panel. Thus, the shunting switch 139 and the reversing switch 115 control the horizontal movement of the table, while the switches 140 and 116 control the vertical movement of the table. This facilitates operation of the mechanism since the operator need only be concerned with the direction of movement of the table. Thus, if the operating lever 24 is adjusted to effect vertical movement of the table, the operator will manipulate only the switches 140 and 116. Conversely, if the operating handle 27 is adjusted for horizontal movement of the table, the operator will use only the switches 139 and 115.

As a safety measure, the operating mechanisms 150 and 151' of the switches 115 and 116 are interconnected so that when one switch is moved to a particular position the other switch is moved to a corresponding position. The operating mechanisms 149 and 149' of the switches 139 and 140 are not interconnected and either switch will provide rapid movement of the table providing the operating handle 46 is adjusted to supply a control voltage which will give full speed to the motor 14. For this operation, the operator so adjusts the handle 46 which controls the potentiometer P to supply the required full speed control voltage and thereafter manipulates either of the switches 139 or 140 to effect rapid movement of the table in either a horizontal or vertical direction, depending upon which of the handles 24 or 27 is set in the operating position.

From the foregoing it will be seen that complete control of the table is effected by the circuit previously described. The circuit is designed to operate with a minimum number of parts; it is entirely automatic or manually operable depending upon requirements; and it is reliable in all respects.

What I claim and desire to secure by Letters Patent is:

1. In a machine of the kind described, a base, movable means including a work supporting table member, mounted movably on the base, a prime mover motor for moving the movable means, the motor being mounted on the movable means, a tool carrying means movably mounted on the base, means for movably operating the tool carrying means, and means connected with the means for operating the tool carrying means for controlling energization of the motor, to energize the motor and cause movement of the movable means to displace the table, only during limited parts of the operaation of the tool carrying means.

2. In a machine of the kind described, a base, movable means including a work supporting table member, mounted movably on the base, a prime mover motor for moving the movable means, the motor being mounted on the movable means, a tool carrying means movably mounted on the base, means for movably operating the tool carrying means, and means for controlling energization of the motor coordinately with operation of the tool carrying means, comprising a flexible energy transmitting device connecting the motor and the means for operating the tool carrying means, and means operably connected with the tool carrying means to limit transmission of energy through the flexible device to the motor, by the operation of the tool carrying means.

3. In a machine of the kind described, a base, a rail member movably mounted on the base for movement in a predetermined path, a work supporting table member mounted on the rail member for movement therewith and for movement thereon, a motor mounted on one of said movable members and connected for moving the table member relatively to the base, tool carrying means movably mounted on the base, means for moving the tool carrying means on the base in a cycle across the table member and back, and means operably connected with the tool carrying means to energize the motor during only part of the movement of the tool carrying means, to move the table member, and further means to limit the movement of the table member by the motor, per cycle of operation of the tool carrying means.

4. In a machine of the kind described, a base, a rail member movably mounted on the base for movement in a predetermined path, a work supporting table member mounted on the rail member for movement therewith and for movement thereon, a motor mounted on one of said movable members and connected for moving the table member relatively to the base, tool carrying means movably mounted on the base, means for moving the tool carrying means on the base in a cycle across the table member and back, and means operably connected with the tool carrying means to energize the motor during only part of the movement of the tool carrying means, to move the table member, and further means to deenergize the motor when the table member has moved a predetermined distance during any one cycle of the tool carrying means.

5. In a machine of the kind described, a base, movable means including a work supporting table member, mounted for movement on the base, a reversible motor mounted on the movable means for effecting movement of the table member relatively to the base, a tool carrying means, means operating the tool carrying means in a cycle across the table member and back, means to preset the direction of rotation of the motor, and means controlled coordinately with the means operating the tool carrying means, to permit energization of the motor in either direction only during part of each cycle of operation of the tool carrying means, and means to stop the motor when the table member has been moved by it a predetermined distance.

6. In a machine of the kind described, a base, movable means including a work supporting table member, mounted for movement on the base, a reversible motor mounted on the movable means for effecting movement of the table member relatively to the base, a tool carrying means, means operating the tool carrying means in a cycle across the table member and back, means to preset the direction of rotation of the motor, and means controlled coordinately with the means operating the tool carrying means, to permit energization of the motor in either direction only during part of each cycle of operation of the tool carrying means, and additional means controlling energization of the motor, comprising switch means settable to determine the direction and distance the motor can operate for each interval during which energization thereof is permitted by the coordinated means aforesaid.

7. In a machine of the kind described, a base, movable means including a work supporting table member, the means being mounted for movement on the base, a motor mounted on the movable means for effecting movement of the table member relatively to the base, a tool carrying means, means operating the tool carrying means in a cycle across the table member and back, means permitting energization of the motor only during part of the cycle of the tool carrying means, means for varying the amount of movement of the movable means produced by the motor per cycle of the tool carrying means, and means varying the speed of the motor.

8. In a machine of the kind described, a base, movable means including a work supporting table member, the means being mounted for movement on the base, a motor mounted on the movable means for effecting movement of the table member relatively to the base, a tool carrying means, means operating the tool carrying means in a cycle across the table member and back, means permitting energization of the motor only during part of the cycle of the tool carrying means, means for varying the amount of movement of the movable means produced by the motor per cycle of the tool carrying means, means varying the speed of the motor, means interconnecting the speed varying means and movement varying means for varying of the former simultaneously with operation of the means varying the amount of movement.

9. In a machine of the kind described, a base, movable means including a work supporting table member, the means being mounted for movement on the base, a motor mounted on the movable means for effecting movement of the table member relatively to the base, a tool carrying means, means operating the tool carrying means in a cycle across the table member and back, means permitting energization of the motor only during part of the cycle of the tool carrying means, and separate means operable to energize the motor at will.

10. In a machine of the kind described, a base, movable means including a work supporting table member, the means being mounted for movement on the base, a motor mounted on the movable means for effecting movement of the table member relatively to the base, a tool carrying means, means operating the tool carrying means in a cycle across the table member and back, means permitting energization of the motor only during part of the cycle of the tool carrying means, means for varying the amount of movement of the movable means produced by the motor per cycle of the tool carrying means, means varying the speed of the motor, and means to effect operation of the motor at will at high speed, without operation of the tool carrying means.

11. In a machine of the kind described, a base, movable means including a work supporting table member, the means being mounted for movement on the base, a motor mounted on the movable means for effecting movement of the table member relatively to the base, a tool carrying means, means operating the tool carrying means in a cycle across the table member and back, means permitting energization of the motor only during part of the cycle of the tool carrying means, additional mechanism comprising switch means presettable to closed position to permit energization of the motor and openable to stop the motor, means moved by the motor in amounts proportional to the number of rotations thereof, connected to open the switch means after a predetermined number of rotations of the motor.

12. In a machine of the kind described, a base, movable means including a work supporting table member, the means being mounted for movement on the base, a motor mounted on the movable means for effecting movement of the table member relatively to the base, a tool carrying means, means operating the tool carrying means in a cycle across the table member and back, means permitting energization of the motor only during part of the cycle of the tool carrying means, means for varying the amount of movement of the movable means produced by the motor per cycle of the tool carrying means, and means varying the speed of the motor, comprising means for varying the voltage applied to the motor.

13. In a machine of the kind described, a base, a table, means mounting the table on the base for movement thereover, a reversible motor connected to the table for moving the table in opposite directions on the base, mechanism controlling energization of the motor, including motor circuit means, reversible switch means in the circuit means to determine the direction of operation of the motor, and master switch means in the circuit means controlling its starting and stopping regardless of operation of the reversible switch means, tool carrying means operable back and forth across the table to provide a cutting stroke and a return stroke, and means closing the master switch means to cause the motor to operate only when the tool carrying means is on its return stroke.

14. In a machine of the kind described, a base, a table means mounting the table on the base for movement thereover, a reversible motor connected to the table for moving the table in opposite directions on the base, mechanism controlling energization of the motor, including motor circuit means, reversible switch means in the circuit means to determine the direction of operation of the motor, and master switch means in the circuit means controlling its starting and stopping regardless of operation of the reversible switch means, tool carrying means operable back and forth across the table to provide a cutting stroke and a return stroke, means closing the master switch means to cause the motor to operate only when the tool carrying means is on its return stroke, and additional switch means presettable to stop the motor after a predetermined movement of the table in either direction.

15. In a machine of the kind described, a base, a table, means mounting the table on the base for movement thereover, a reversible motor connected to the table for moving the table in opposite directions on the base, mechanism controlling energization of the motor, including motor circuit means, reversible switch means in the circuit means to determine the direction of operation of the motor, and master switch means in the circuit means controlling its starting and stopping regardless of operation of the reversible switch means, tool carrying means operable back and forth across the table to provide a cutting stroke and a return stroke, means closing the master switch means to cause the motor to operate only when the tool carrying means is on its return stroke, and means for causing the reversible movements of the table to take place selectively on a horizontal axis or on a vertical axis.

16. In a tool shaping machine of the kind described, having a base, a table mounted for movement over the base, a motor for moving the table, a tool holding means movable across the table in a cutting and a return stroke, and a shaft driven by the motor, the combination therewith of a rotary switch element movable from a starting position angularly, a magnetic clutch energizable to connect the rotary switch element to the shaft for conjoint movement to return the rotary switch element to starting position after predetermined rotation of the shaft, switch means closed when the switch element is out of starting position, control switch mechanism closed only when the tool holding means is on its return stroke, a circuit for energizing the motor only when the switch means is closed and the control switch mechanism is closed, and means to energize the magnetic clutch when said circuit is energized.

17. In a tool shaping machine of the kind described, having a base, a table mounted for movement over the base, a motor for moving the table, a tool holding means movable across the table in a cutting and a return stroke, and a shaft driven by the motor, the combination therewith of a rotary switch element movable from a starting position angularly, a magnetic clutch energizable to connect the rotary switch element to the shaft for conjoint movement to return the rotary switch element to starting position after predetermined rotation of the shaft, switch means closed when the switch element is out of starting position, control switch mechanism closed only when the tool holding means is on its return stroke, a circuit for energizing the motor only when the switch means is closed and the control switch mechanism is closed, means to energize the magnetic clutch when said circuit is energized, and separate circuit means for energizing the motor independently of the control switch mechanism, and said separate circuit means not including the magnetic clutch.

18. In a machine of the kind described, a base, a table mounted for movement over the base, a motor for moving the table, a tool holding means movable across the table in a cutting and a return stroke, a shaft driven by the motor, a rotary switch element movable from a starting position angularly, a magnetic clutch energizable to connect the rotary switch element to the shaft for conjoint movement to return the rotary switch element to starting position after predetermined rotation of the shaft, switch means closed when the switch element is out of starting position, control switch mechanism closed only when the tool holding means is on its return stroke, a circuit for energizing the motor only when the switch means is closed and the control switch mechanism is closed, means to energize the magnetic clutch when said circuit is energized, means for angularly displacing the rotary switch element from starting position, means for varying the speed of the motor, and means connecting the speed varying means with the displacing means for conjoint operation to relate the speed of the motor to the distance it operates before the switch means operated by the switch element is opened.

19. In a tool machine, a base, movable mechanism on the base including cross rails movable in one direction on the base, a table movably mounted on the rails to move in a direction at right angles to the movement of the rails, a drive shaft mounted on the movable mechanism rotatable to move the rails, another drive shaft also mounted on the movable mechanism rotatable to move the table, a motor mounted on said movable mechanism, a motor shaft selectively connectable with either drive shaft, and means to control energization of the motor.

20. In a tool machine, a base, movable mechanism on the base including cross rails movable in one direction on the base, a table movably mounted on the rails to move in a direction at right angles to the movement of the rails, a drive shaft mounted on the movable mechanism rotatable to move the rails, another drive shaft also mounted on the movable mechanism rotatable to move the table, a motor mounted on said movable mechanism, a motor shaft selectively connectable with either drive shaft, means to control energization of the motor, comprising means connectable with the motor shaft, and settable to varying angular distances from a starting position and movable back to starting position by the motor shaft when connected therewith, and switch means in series with the motor, closed when the connectable means is out of starting position and opened when it is in starting position.

21. In a tool shaping machine of the kind described having an intermittent feeding mechanism for operating a work device in either of opposite directions and a motor for moving the work device, the combination therewith of a switch operating element rotatably mounted for angular displacement in opposite directions from a starting position, switch means closed when the element is out of starting position in either direction and opened when the element is in starting position, an angularly movable device coaxial with the element, a spring connecting the element and the device to cause the element to follow movement of the device, but to be yieldably movable angularly relatively thereto, and to return to initial relationship when released, whereby when the device is adjusted, the switch means is closed, and may be opened by movement of the element, but automatically reclosed upon release of the element, a magnetic clutch means energizable when the motor is energized, for connecting the switch operating element with the motor for angular displacement thereof when the motor is operated.

22. In a tool shaping machine having a base, a carriage movable intermittently on the base, and a motor for moving the carriage, the combination therewith of a circuit for the motor including an electronic valve, a grid therein subject to varying potential to produce varying grid bias on the valve, thereby to regulate the amount of current supplied to the motor, a grid circuit including a variable means to adjust the grid potential, mechanism to adjust the length of an intermittent movement of the carriage by the motor, and means interconnecting the adjusting mechanism with variable means, so that the length of an intermittent movement of the carriage and its speed are adjusted together.

ERNEST GYGAX.

REFERENCES CITED

The following references are of record in the file of this patent:

UNITED STATES PATENTS

| Number | Name | Date |
|---|---|---|
| 665,966 | Miles | Jan. 15, 1901 |
| 790,847 | Mills | May 23, 1905 |
| 930,088 | Robinson | Aug. 3, 1909 |
| 1,166,974 | De Leeuw | Jan. 4, 1916 |
| 1,215,514 | Frede | Feb. 13, 1917 |
| 1,615,185 | Zimmermann | Jan. 18, 1927 |
| 1,630,042 | Watcher | May 24, 1927 |
| 1,889,930 | Morton | May 23, 1933 |
| 1,948,068 | File | Feb. 20, 1934 |
| 1,960,566 | Zimmermann | May 29, 1934 |
| 2,069,701 | Emmons | Feb. 2, 1937 |
| 2,220,382 | Zimmerman | Nov. 5, 1940 |
| 2,348,259 | Kratz | May 9, 1944 |
| 2,454,634 | Craig | Nov. 23, 1948 |